Feb. 3, 1931.  W. R. SCHOFIELD, JR  1,791,383
CONTROL SYSTEM
Filed May 1, 1929  2 Sheets-Sheet 1

Inventor
William R. Schofield Jr.
Cornelius D. Ehret
By his Attorney.

Feb. 3, 1931. W. R. SCHOFIELD, JR 1,791,383
CONTROL SYSTEM
Filed May 1, 1929 2 Sheets-Sheet 2
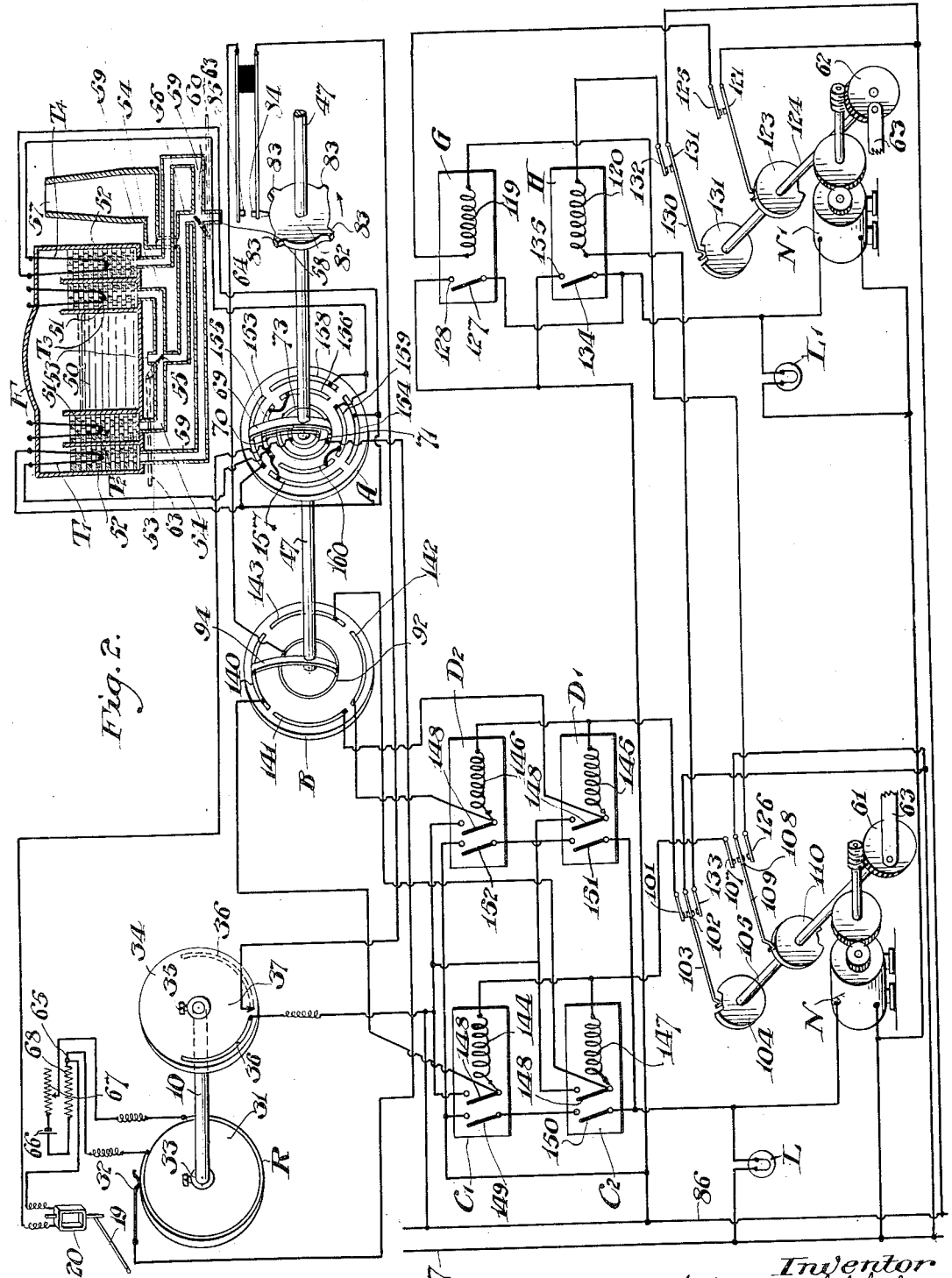

Patented Feb. 3, 1931

1,791,383

UNITED STATES PATENT OFFICE

WILLIAM R. SCHOFIELD, JR., OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

CONTROL SYSTEM

Application filed May 1, 1929. Serial No. 359,623.

My invention relates to a system of control, whereby in response to predetermined changes or differences between the magnitudes of a plurality of conditions, as thermal, electrical, mechanical, physical, or chemical, a plurality of controls is effected; and more particularly to a system of multiple control in which the controls are those of the application of an agent or agents causing the changes in said conditions, in which there is effected change in the application of an agent or agents from one region to another, or in which one agent is interchanged for another.

Specifically, my invention relates to the control of regenerative furnaces characterized by the fact that in response to attainment of predetermined difference between the magnitudes of the temperatures in different portions of the furnace, the air and fuel valves are controlled to effect a change as regards the portion or region of the furnace to or through which the air and fuel are supplied, or to effect a reversal of action as between the heating and regenerative portions of the furnace.

In accordance with my invention, a plurality of devices, responsive to magnitudes of a plurality of conditions operate differentially to effect a control which effects the conditions to which said devices are responsive to cause a reversal of the control; more particularly, reversal is effected when the magnitude of one condition attains a predetermined value and there exists a predetermined difference in magnitude between conditions.

My invention resides in a method and apparatus of the character hereinafter described and claimed.

For an understanding of my method, and for an illustration of one of the various forms my apparatus may take, reference is to be had to the accompanying drawings, in which:

Fig. 2 is a view of a regenerative furnace and a diagram of electrical circuits and devices utilized in its control.

Figure 1:
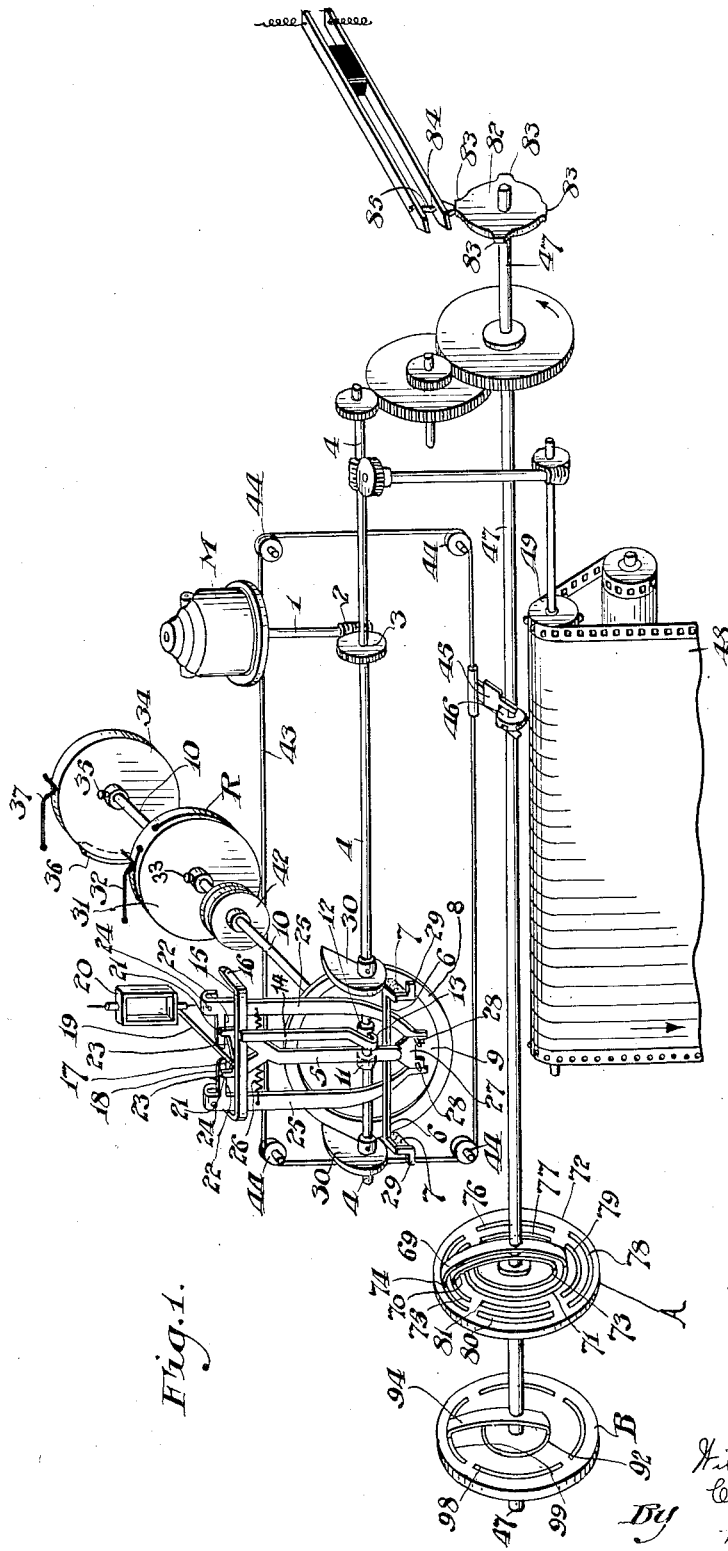
Fig. 1 is an elemental perspective view of apparatus utilizable in accordance with my invention.

For the practice of my invention, any suitable type of control apparatus may be utilized, particularly one controlled by a deflecting galvanometer or any other instrument, mechanical or electrical, which deflects in response to changes in a condition to be controlled.

In the example illustrated in Fig. 1, the control apparatus is in general similar to the mechanism of Leeds Patent No. 1,125,699, January 19, 1915.

The source of power M, as an electric motor, continuously rotates the shaft 1 upon which is secured the worm 2 which drives the gear 3 secured upon the shaft 4. Upon the arm 5, mounted upon pivots, not shown, is pivoted the arm 6, on each end of which is carried a shoe 7, of cork or equivalent material, frictionally engaging the rim 8 of the clutch disc 9 secured upon the shaft 10. A cam 11, secured upon the shaft 4, periodically moves the lever 5 outwardly away from the disc 9 in opposition to a spring, not shown, thereby lifting the shoes 7 free from the rim 8, and after predetermined rotation of cam 11 the lever 5 is returned to normal position, bringing the shoes 7 again into engagement with the rim 8. A second cam 12, secured upon the shaft 4, actuates the end of finger 13, upon the lower end of the arm 14, when the shoes 7 are free of the rim 8. The arm 14 is secured at its upper end to the member 15, pivoted at 16.

Secured upon the member 15 is the member 17, whose upper edge 18 is inclined upwardly and outwardly from the center. Disposed immediately above the edge 18 and normally swinging free thereof is the needle or pointer 19, of any suitable deflecting instrument, such as a galvanometer whose movable element or coil 20 deflects the member 19. The abutments 21 on member 17 limit the deflection of the needle 19. Above the needle 19 are the preferably straight and horizontal edges 22 of the members 23, pivoted, respectively, at 24, beneath which needle 19 normally swings freely. The members 23 extend toward each other and are separated by a gap at their inner ends of sufficient width to allow free entry of the needle 19 when in balanced or zero position. The members 23 have the downwardly extending arms 25, biased toward each other by the spring 26. Attached to the lower end of the arm 5 is the plate 27 carrying the pins 28 co-operating with the lower ends of the members 25. On opposite ends of the arm 6 are the lugs 29 adapted to be engaged, when the arm 6 has been deflected from its normal horizontal position by either of the members 25, by the cams 30 secured upon the shaft 4.

As described in the aforesaid Letters Patent, when the galvanometer needle 19 deflects in one direction from its mid or zero position indicated, it is periodically clamped between the lower edge 22 of one of the members 23, under which it has deflected, and an edge 18 of the member 17, thereby deflecting the member 6, when the arm 5 has been moved outwardly by the cam 11, to an extent corresponding with the extent of deflection of the needle 19. Immediately thereafter the shoes 7 come into engagement with the rim 8 of disc 9, and thereafter one of the cams 30 engages one of the lugs 29, restoring lever 6 to its normal position indicated, and thereby carrying around with it the disc 9 and the thereto attached shaft 10 and the parts connected thereto. Similarly, deflection of needle 19 in opposite direction effects movement of the shaft 10 in opposite direction and to an extent corresponding to the extent of deflection of the needle 19.

Secured upon the shaft 10 is a disc 31, of insulating material, carrying upon its periphery the resistance conductor R, with which co-acts the stationary brush or contact 32. The disc 31 may be secured in any suitable angular position with respect to the shaft 10 by the set screw 33.

Secured upon the shaft 10 is a second disc 34, secured in any suitable angular position by the set screw 35, and carrying a contact segment 36, with which co-acts a stationary brush or contact 37.

Secured upon the shaft 10 is the pulley 42, around which is wrapped the cord 43, passing over idler pulleys 44 and secured to the carriage 45, in which is pivoted the recorder type wheel 46, bearing a suitable number of circumferentially spaced type characters, and continuously rotated by the shaft 47 driven through suitable gearing from the shaft 4. A record sheet 48 is continuously advanced by the roller 49, continuously driven by the shaft 4, and the type wheel 46 is periodically depressed against the record sheet 48, by mechanism well understood in the art and not herein shown.

Referring to Fig. 2, F represents a regenerative furnace having the tank 50, in which glass or other material to be heated is contained. To either side of the tank 50 is a pair of regenerative chambers 51 and 52, each containing checker brick, as well understood in the art, one chamber of each pair, as 51, being traversed by the incoming fuel, as gas, and the other chamber, as 52, being traversed by incoming air. Gas is supplied through the pipe 53, with which communicate the branch gas pipes 54, communicating with the gas chambers 51. The branch pipes 54 are brought alternately into communication with the supply pipe 53 by suitable control of the gas valve 55, which also controls communication between the branch pipes 54 and the flue 56 permanently in communication with the stack or chimney 57. Air is supplied under pressure through the air supply pipe 58, with which communicate the branch air pipes 59, the valve 60 serving to control admission of air to one or the other of the air chambers 52.

In the position of the valves 55 and 60 indicated, gas is delivered to the right hand gas chamber 51 and air is delivered to the right hand air chamber 52, while the pipe 54 communicating with the left hand gas chamber 51 is in communication with the stack 57, as is also the pipe 59 connecting with the left hand air chamber 52. Upon reversal of position of the valves 55 and 60, gas and air are delivered to the left hand gas and air chambers 51 and 52, and the pipes 54 and 59 connecting with the right hand gas and air chambers connect with the stack 57.

In the operation of regenerative furnaces the valves 55 and 60 are ordinarily operated manually, and are generally reversed or operated after predetermined intervals.

In accordance with my invention, however, the valves 55 and 60 are operated, preferably automatically, in response to temperature conditions in the gas or air regenerative chambers.

For automatic operation of the valves 55 and 60 I provide any suitable motive devices, such as electric motors N and N1, which when energized drive, through suitable reducing gearing, the wheels 61 and 62, respectively, to each of which is pivoted a connecting rod 63 pivoted in turn to the valve-operating arm or lever 64. Notwithstanding rotation of the wheel 61 and 62 always in the same direction, the valve-operating arms or levers 64 are moved in opposite directions to effect reversals of the valves 55 and 60. It will be understood, however, that reversible motors may be employed, as well understood in the art of control by electric motors, for effecting reversals of the valves 55 and 60.

Suitably positioned to be subjected or responsive to the temperatures in the air and gas regenerative chambers are the thermocouples or equivalent temperature-responsive devices T1, T2, T3 and T4, which are brought into a circuit of any suitable type, as in series with the galvanometer coil 20 in a branch or circuit connected to the points 32 and 65 of a potentiometer circuit including the source of current or battery 66, adjustable resistance 67, the aforesaid resistance R, and resistance 68.

The switch A is of a character effecting the connection of two thermo-couples, as T1 and T4, in succession with the galvanometer coil 20. and alternately connecting them in series with each other, and in such relation that their electromotive forces oppose each other. For this purpose the negative terminal of the couple T1 is connected to the diametrically opposed switch terminals 153 and 154, while its positive terminal is connected to the two neighboring switch contacts 155 and 156 and to the contact 157. The positive terminal of the couple T4 is connected with the contacts 158, 159 and 160, while the negative terminal of the couple is connected to the negative terminal of the couple T1 and the corresponding switch contacts. In the position of the switch A indicated in Fig. 2 couple T1 alone is in circuit with the galvanometer coil 20 for purposes of recording the temperature to which that couple is subjected. When the switch contacts 69 and 70 are in engagement with the contacts 157 and 160, the two couples T1 and T4 are in series with each other, but opposed, whereby there is impressed upon the circuit of the galvanometer coil 20 an electromotive-force which is the difference between the electro-motive-forces developed by these couples and representative of the difference of temperatures in the two chambers in which the couples T1 and T4 are disposed. In the next position of the switch contacts 69 and 70, when they are in engagement with the contacts 154 and 159, the couple T4 alone is in circuit and effects the production of a record. And in the fourth position of the contacts 69 and 70 in engagement with contacts 158 and 156 the couples T1 and T4 are again in series with each other, and opposed, but their sense of connection in the galvanometer coil circuit is relatively reversed, so that the current due to the difference in their electro-motive-forces will flow in the same direction through the galvanometer coil 20 as before. The type wheel 46, Fig. 1, under these circumstances produces four records, two for the couples T1 and T4 when separately in circuit, and two further records when they are in circuit and opposed to each other.

Secured upon the shaft 47 is a cam 82 having the four high points 83 for moving the contact 84 into engagement with contact 85 for a short time just as the outer ends of the brushes 69 and 70 are leaving a pair of contacts of the switch A. The brush 37 is connected to the circumferentially continuous stationary contact ring 92, when contacts 84 and 85 are closed, of the relay selecting switch B comprising the brushes 94 insulated from the shaft 47 and rotated by the shaft 47. The inner end of the brush 94 engages with contact 92 and its outer end co-acts with two pairs of arcuate contacts 140, 141, 142 and 143. The contact 92 connects through the switch 84, 85 with the supply circuit conductor 86 throuh the contact 36 and brush 37 associated with the disc 34 on shaft 10. The contacts 140—143 connect, respectively, with a terminal of each of the relay windings 144, 145, 146 and 147, respectively. The remaining terminals of the windings 145 and 146 connect through the contacts 101 and 102 with the other supply circuit conductor 87; and the remaining terminals of the windings 144 and 147 connect through the contacts 107 and 108 with the conductor 87. Each of the relays is provided with two tongues, attracted in opposition to springs, not shown, into engagement with co-operating contacts. The tongues 148 effect continuation of the energization of their respective relay coils after opening of the switch 84, 85. The tongues 149 and 150 of relays C1 and C2 are in series with each other, whereby when both are in circuit closing position the motor N is energized. Similarly, the tongues 151 and 152 of relays D1 and D2 are in series with each other, whereby when both are in circuit closing position the motor N will be energized.

Upon energization the motor N drives the shaft 105 on which are mounted cams 104, 110 through the reducing gearing indicated until that shaft has rotated through 180 degrees, whereupon the circuit of the windings of one or the other groups of the relays C1, C2 and D1, D2 are opened by separation of contact 102 from contact 101 or by separation of contact 108 from contact 107, thereby deenergizing the associated relay and opening the motor circuit. In other words, the motor in successive energizations rotates the shaft 105 through 180 degrees for each energization, and each energization effects movement of the valve 55 from its one to its other position.

The motor N1, which operates the valves 60, is controlled by either of the relays G and H. One terminal of the winding 119 of relay G and one terminal of the winding 120 of relay H are connected to the supply conductor 86 through switches 121, 125 and 131, 132 respectively. The other terminal of winding 119 is connected to the supply conductor 87 through contacts 126, 108 controlled by motor N, wherefore when contacts 121, 125 and 126, 108 are in engagement with each other the winding 119 is energized, drawing the relay tongue 127, in opposition to a spring, not shown, into engagement with the contact 128, causing energization of the motor N1 from the supply conductors 86, 87. Similarly the other terminal of the relay winding 120 connects with the supply conductor 87 through switch contacts 133, 102 controlled by the motor N. When the contacts 131, 132 and 133, 102 are in engagement with each other, the winding 120 is energized, causing attraction of the relay tongue 134, in opposition to a spring, not shown, into engagement with the contact 135, thereby energizing the motor N1 from the conductors 86, 87. For each energization of the motor N1, the shaft 124 is rotated through 180 degrees, whereupon the motor is de-energized because of separation of contact 121 from contact 125, or 131 from 132, thereby de-energizing the associated relay, and opening the motor circuit. Each energization of the motor N1 effects movement of the valve 60 from its one position to its other.

It is accordingly characteristic of the motor controls described that the motor N1 is in effect under the control of the motor N. It is preferred further, in accord with preferred regenerative furnace practice, that the air-controlling valve 60 shall be shifted or moved after the gas-control valve 55 is actuated. This sequence of operation is possible with the controls described in that the motor N1 is not energized until an appreciable time after energization of the motor N, or, in fact, until deenergization of the motor N.

However, if it be desirable that the two motors N and N1 be simultaneously controlled and energized, the motor N1 need simply be connected in parallel with the motor N, whereupon the relays G, H, the switches 121, 125 and 129, 132, and contacts 107 and 126 may be omitted.

With the valves 55 and 60 in the position indicated and the contacts 69 and 70 of switch A in engagement with contacts 158 and 156, the couples T1 and T4 are in series with each other and opposed. The temperature of the couple T1 is rising, while the temperature of couple T4 is falling. At first there is impressed upon the circuit of the coil 20 an electro-motive-force whose direction is such as to cause deflection of needle 19 in such direction as to effect rotation of the shaft 10 in direction corresponding with falling temperature. As the temperature of couple T1 increases, its electro-motive-force increases, and as the temperature of couple T4 decreases its electro-motive-force decreases until eventually the electro-motive force of couple T1 exceeds that of couple T4, whereupon the effective electro-motive-force impressed upon the circuit of coil 20 is in the reverse sense to that described, causing the shaft 10 to be adjusted in direction corresponding with rising temperature, and eventually the contact 36 will engage brush 37 when the difference between the temperatures to which couples T1 and T4 are subjected attains a predetermined magnitude, whereupon a relay C2 will be energized, first temporarily through switch 84, 85, and then continuously due to attraction of the tongue 148. Accordingly, the tongue 150 is brought to and remains in circuit closing position, but motor N is not yet energized. Thereafter the contacts 69 and 70 of switch A take the position indicated in which case the couple T1 alone is in circuit, and when it attains a predetermined high temperature relay C1 will be energized, closing circuit at tongue 149, and thereby energizing the motors N and N1, causing reversal of the valves 55 and 60. Accordingly, the operation of the valves is not effected until the existence of two conditions, one of them a predetermined high temperature in one of the furnace chambers and the other a predetermined temperature difference in the air (or gas) regenerative chambers at opposite ends of the furnace.

Similarly, when the switch contacts 69 and 70 are next in engagement with contacts 157 and 160, the couples T1 and T4 are again in series with each other and opposing, and when the electro-motive-force of couple T4 predominates over that of couple T1, the relay D1 will be energized, bringing its tongue 151 to circuit closing position, without, however, effecting a control of the motors. Thereafter, when contacts 69 and 70 are in engagement with contacts 154 and 159, couple T4 alone is in circuit, and when it attains a predetermined high temperature relay D2 is energized, completing the motor control circuit by tongue 152, whereupon the motors N and N1 in succession reverse their respective valves 55 and 60. Here again the reversal has been in response to two conditions, first, a predetermined difference in temperature in the air (or gas) chambers at the opposite ends of the furnace, and secondly, a predetermined high temperature in the air (or gas) regenerative chamber at the right end of the furnace F, Fig. 2.

While in the above description it has been assumed that the control is determined by attainment of predetermined high temperature, it may be effected also by attainment of predetermined low temperature, in which case the contact 36 may be shifted to the right side of the disc 34, as indicated in dotted lines.

With control systems of the character hereinbefore described there may be associated suitable indicating means to indicate the conditions obtaining in the furnace.

For example, in shunt with the motors N and N1 may be connected indicators or signals, for example, incandescent lamps L and L1, each of which glows whenever its associated motor is energized, indicating that the corresponding valves are about to be or should be operated. If a lamp L should glow and should not be followed by the glowing of the lamp L1, it will indicate to an attendant that something is out of order concerning the motor N1 or its associated control circuits. In case the lamp L glows, and continues to glow for a considerable time, it will indicate to an attendant that there is something out of order as regards the motor N or the circuits controlling it or controlled by it.

It will be understood of course that where the valves 55 and 60 are manually operated, in which case the motors are omitted, glowing of the lamp L will indicate to the operator that the time has arrived for reversing the valves.

While in the foregoing description of Fig. 2 the valve mechanism has been described as under the control of the couples T1 and T4, it will be understood that T1 and T3, T2 and T3, or T2 and T4 may be utilized.

The system of control herein disclosed and claimed is of the character shown and described in my prior Letters Patent No. 1,683,809, September 11, 1928.

What I claim is:

1. The method of controlling a regenerative furnace having regenerative chambers and means for controlling the supply of combustion materials, which comprises effecting actuation of said means in response to a predetermined difference between the temperatures in a plurality of said chambers.

2. The method of controlling a regenerative furnace having regenerative chambers and means for controlling the supply of combustion materials, which comprises effecting actuation of said means in response to a predetermined difference between the temperatures in a plurality of said chambers, and thereafter effecting actuation of said means in reverse direction in response to attainment of predetermined reversed difference between the temperatures in said chambers.

3. The method of controlling a regenerative furnace having regenerative chambers and valve mechanisms for transferring the flow of fuel and air, respectively, from one pair of said chambers to another pair, which comprises effecting actuation of said valve mechanisms in response to attainment of predetermined difference between a high temperature in one chamber of one of said pairs and a lower temperature in another chamber of another of said pairs.

4. The method of controlling a regenerative furnace having regenerative chambers and valve mechanisms for transferring the flow of fuel and air, respectively, from one pair of said chambers to another pair, which comprises effecting actuation of said valve mechanisms in response to attainment of predetermined difference between a high temperature in one chamber of one of said pairs and a lower temperature in another chamber of another of said pairs, and thereafter effecting reversal of said valve mechanisms in response to attainment of a predetermined difference between a high temperature in said other of said chambers of said other of said pairs and a lower temperature in said one of said chambers in said one of said pairs.

5. A control system comprising a plurality of devices each responsive to changes in the magnitude of a condition, means effecting changes in the magnitudes of said conditions, mechanism controlling said means, and means controlled by said devices jointly in response to attainment by said conditions of predetermined magnitudes and controlling said mechanism.

6. A control system comprising a plurality of devices each responsive to changes in the magnitude of a condition, means effecting changes in the magnitudes of said conditions, mechanism controlling said means, and means controlled by said devices jointly in response to attainment of predetermined magnitude of difference between the magnitudes of said conditions and controlling said mechanism.

7. A control system comprising a plurality of temperature-responsive devices subjected respectively to the temperatures in different regions, means controlling increase in application of heat in one of said regions and decrease in application of heat in another of said regions, and mechanism controlling said means and controlled by said temperature-responsive devices jointly in response to attainment of predetermined magnitude of difference between the temperatures to which said devices are subjected.

8. The combination with a regenerative furnace comprising a plurality of pairs of regenerative chambers, of valve mechanism controlling transfer of flow of fuel and air from the chambers of one pair to those of another pair, temperature-responsive devices subjected respectively to temperatures in different chambers, and means controlling said valve mechanism and controlled by said temperature-responsive devices jointly in response to attainment of predetermined magnitude of difference in the temperatures in said chambers.

9. The combination with a regenerative furnace comprising a plurality of pairs of regenerative chambers, of valve mechanism controlling transfer of flow of fuel and air from the chambers of one pair to those of another pair, temperature-responsive devices subjected respectively to temperatures of chambers of the different pairs of chambers, and means controlling said valve mechanism and controlled by said temperature-responsive devices jointly in response to attainment of predetermined magnitude of difference in the temperatures in said chambers.

10. The method of controlling a regenerative furnace having regenerative chambers and means for controlling the supply of combustion materials, which comprises effecting actuation of said means in response to a predetermined difference between the temperatures in a plurality of said chambers, and a predetermined temperature of one of said chambers.

11. The method of controlling a regenerative furnace having regenerative chambers and means for controlling the supply of combustion materials, which comprises effecting actuation of said means in response to a predetermined difference between the temperatures in a plurality of said chambers and a predetermined temperature of one of said chambers, and thereafter effecting actuation of said means in reverse direction in response to attainment of predetermined reversed difference between the temperatures in said chambers.

12. The method of controlling a regenerative furnace having regenerative chambers and means for controlling the supply of combustion materials, which comprises effecting actuation of said means in response to a predetermined difference between the temperatures in a plurality of said chambers and a predetermined temperature of one of said chambers, and thereafter effecting actuation of said means in reverse direction in response to attainment of predetermined reversed difference between the temperatures in said chambers and a predetermined temperature of one of said chambers.

13. The method of controlling a regenerative furnace having regenerative chambers and valve mechanisms for transferring the flow of fuel and air, respectively, from one pair of said chambers to another pair, which comprises effecting actuation of said valve mechanisms in response to attainment of predetermined difference between a high temperature in one chamber of one of said pairs and a lower temperature in another chamber of another of said pairs, and of predetermined temperature of a chamber of one of said pairs.

14. The method of controlling a regenerative furnace having regenerative chambers and valve mechanisms for transferring the flow of fuel and air, respectively, from one pair of said chambers to another pair, which comprises effecting actuation of said valve mechanisms in response to attainment of predetermined difference between a high temperature in one chamber of one of said pairs and a lower temperature in another of said pairs, and of predetermined temperature in a chamber of one of said pairs, and thereafter effecting reversal in response to attainment of predetermined difference between a high temperature in said other of said chambers of said other of said pairs and a lower temperature in said one of said chambers in said one of said pair.

15. The method of controlling a regenerative furnace having regenerative chambers and valve mechanisms for transferring the flow of fuel and air, respectively, from one pair of said chambers to another pair, which comprises effecting actuation of said valve mechanisms in response to attainment of predetermined difference between a high temperature in one chamber of one of said pairs and a lower temperature in another of said pairs, and of predetermined temperature in a chamber of one of said pairs, and thereafter effecting reversal in response to attainment of predetermined difference between a high temperature in said other of said chambers of said other of said pairs and a lower temperature in said one of said chambers in said one of said pairs and of predetermined temperature in a chamber of one of said pairs.

16. The method of controlling a regenerative furnace having regenerative chambers and valve mechanism for transferring the flow of combustion materials which comprises effecting operation of a signal in response to attainment of predetermined difference between temperatures of regenerative chambers, and substantially simultaneously with operation of said signal effecting operation of the valve mechanism.

17. The method of controlling a regenerative furnace having regenerative chambers and valve mechanisms for transferring, respectively, the fuel and air from one pair of said chambers to another pair, which comprises effecting actuation of the fuel and air valve mechanisms in succession in response to attainment of predetermined difference between the temperatures in a pair of said chamber.

18. The method of controlling a regenerative furnace having regenerative chambers and valve mechanism for transferring the flow of combustion materials which comprises alternately measuring the difference and reverse difference of temperatures between a pair of said chambers, and effecting operation of the valve mechanism upon attainment of a predetermined magnitude of difference or reverse difference of temperatures.

19. The method of controlling a regenerative furnace having regenerative chambers and valve mechanism for transferring the flow of combustion materials which comprises alternately measuring the difference and reverse difference of temperatures between a pair of said chambers, effecting actuation of a signal in response to attainment of predetermined magnitude of difference of reverse difference, and substantially simultaneously with operation of said signal, effecting actuation of the valve mechanism.

20. The method of controlling a regenerative furnace having regenerative chambers and valve mechanism for transferring the flow of combustion materials which comprises effecting operation of a signal in response to attainment of predetermined difference between chambers, and predetermined temperature in one chamber, and effecting actuation of said valves upon operation of the signal.

21. The method of controlling a regenerative furnace having regenerative chambers and means for controlling the supply of combustion materials, which comprises effecting actuation of said means automatically in response to a predetermined difference between the temperatures in a plurality of said chambers.

22. The method of controlling a regenerative furnace having regenerative chambers and means for controlling the supply of combustion materials, which comprises effecting operation of a signal and actuation of said means automatically in response to predetermined difference between the temperatures in a plurality of said chambers.

23. The method of controlling a regenerative furnace having regenerative chambers and valve mechanisms for transferring, respectively, the fuel and air from one pair of said chambers to another pair, which comprises effecting actuation of the fuel and air valve mechanisms in succession in response to attainment of predetermined difference between the temperatures in a pair of said chambers and predetermined temperature of one of said chambers.

24. The method of controlling a regenerative furnace having regenerative chambers and valve mechanisms for transferring, respectively, the fuel and air from one pair of said chambers to another pair, which comprises effecting actuation of a signal in response to attainment of predetermined difference between temperatures of regenerative chambers, substantially simultaneously with operation of said signal effecting operation of one of said valve mechanisms, effecting actuation of a second signal in response to movement of said mechanism, and substantially simultaneously with operation of the second signal effecting operation of the other of said valve mechanisms.

25. The method of controlling a regenerative furnace having regenerative chambers and valve mechanisms for transferring, respectively, the fuel and air from one pair of said chambers to another pair, which comprises effecting actuation of a signal in response to attainment of predetermined difference between temperatures of regenerative chambers and predetermined temperature of one of them, substantially simultaneously with operation of said signal effecting operation of one of said valve mechanisms, effecting actuation of a second signal in response to movement of said mechanism, and substantially simultaneously with operation of the second signal effecting operation of the other of said valve mechanisms.

WILLIAM R. SCHOFIELD, Jr.